4?? -408 SR
12/7/82 XR 4,362,772

United States Patent [19] [11] 4,362,772
Tsukagoshi et al. [45] Dec. 7, 1982

[54] VIBRATORY ELEMENTS FOR AUDIO EQUIPMENT

[75] Inventors: Tsunehiro Tsukagoshi; Shinichi Yokozeki; Sumio Hagiwara; Masataka Uchidoi; Toshikazu Yoshino; Yasuyuki Arai, all of Tokorozawa, Japan

[73] Assignee: Pioneer Electronic Corporation, Tokyo, Japan

[21] Appl. No.: 244,895

[22] Filed: Mar. 18, 1981

[30] Foreign Application Priority Data

Mar. 31, 1980 [JP] Japan .................................. 55-40267
Mar. 31, 1980 [JP] Japan .................................. 55-40268
Mar. 31, 1980 [JP] Japan .................................. 55-40269

[51] Int. Cl.[3] .......................... B32B 1/08; B32B 5/00; B32B 9/00

[52] U.S. Cl. ...................................... 428/36; 428/338; 428/408; 524/431

[58] Field of Search ............... 428/402, 404, 408, 338, 428/523, 36; 260/42, 46; 369/158, 244, 247, 256; 524/431

[56] References Cited

U.S. PATENT DOCUMENTS 3,923,697 12/1975 Ellis .................................... 524/431
4,199,628 4/1980 Caines ................................ 428/408
4,254,184 3/1981 Tsukagoshi et al. ................ 428/408
4,261,580 4/1981 Tsukagoshi et al. .................. 428/36
4,269,416 5/1981 Yoshino et al. ..................... 428/408
4,282,288 8/1981 Yoshino et al. ..................... 428/408

FOREIGN PATENT DOCUMENTS 1911303 9/1970 Fed. Rep. of Germany ...... 428/408

*Primary Examiner*—William J. Van Balen

[57] ABSTRACT

Vibratory elements for use in audio equipment are fabricated from a kneaded mixture comprising polypropylene and flaky graphite powder. The kneaded mixture is rolled into a sheet in which graphite flakes are oriented parallel to the surface, and the sheet is then formed into a desired shape, for example, a dome- or cone-shaped diaphragm and a cantilever, as by vacuum forming, air-pressure forming or press molding. The mixture may further include polymethyl methacrylate and/or rubber-like material. The elements are characterized by improved temperature resistance.

12 Claims, 19 Drawing Figures 1 2

VIBRATORY ELEMENTS FOR AUDIO EQUIPMENT

BACKGROUND OF THE INVENTION

This invention relates to elements for use in audio equipment, and particularly to acoustic vibratory elements such as diaphragms for speakers and microphones and cartridge cantilevers for record players, the elements being lightweight, highly stiff and highly elastic and having a sufficient internal loss (damping) and an improved temperature resistance.

In general, acoustic vibratory elements such as acoustic diaphragms and cantilevers are required to have low density, high stiffness, high elasticity, and sufficient internal loss. Low density, high stiffness and high elasticity are necessary to provide efficient reproduction up to a high frequency range without causing partial vibration while sufficient internal loss (damping) is effective for preventing sound pressure from rapidly rising at about resonance frequencies in the high range as well as improving damping characteristics. Acoustic vibratory elements are known which are formed from lightweight, highly elastic materials, for example, metals such as aluminum, titanium and beryllium, and composite materials such as carbon filter reinforced plastics (CFRP). None of these known materials are free of the problem of poor internal loss. Acoustic diaphragms with sufficient internal loss are also known which are formed from paper, synthetic resins or composite materials thereof. Though these materials have sufficient internal loss, they show a low modulus of elasticity and hence, a low specific modulus (ratio of modulus of elasticity E to density $\rho$, simply referred to as "$E/\rho$"). There is a need for material which has not only a low density and high elasticity, but also sufficient internal loss.

Recently, the inventors proposed in U.S. Ser. No. 147,866 (filed May 8, 1980) cantilevers and diaphragms which are characterized by low density, high elasticity and high internal loss, the cantilevers and diaphragms being formed from a kneaded mixture comprising polyvinyl chloride, polyvinylidene chloride and flaky graphite powder. The proposed material has improved physical properties which are not found in prior art materials. In various application of the previously proposed material, the inventors encountered a problem that it is insufficient in temperature resistance. Elements made of this material tend to be deformed particularly when used in automobile audio sets which may be exposed to the summer sun or possibly used in the tropics.

SUMMARY OF THE INVENTION

It is therefore an object of the present invention to provide an improved acoustic vibratory element which has satisfactory temperature resistance as well as excellent qualities of low density, high elasticity and sufficient internal loss.

According to a first aspect of the present invention, there is provided an acoustic vibratory element fabricated from a kneaded mixture comprising polypropylene and flaky graphite powder, the graphite flakes being oriented substantially parallel to the surface of the element.

BRIEF DESCRIPTION OF THE DRAWINGS

These and other objects, features and advantages of the present invention will be more fully understood from the following description taken in connection with the accompanying drawings in which:

FIG. **1*a*** is a cross-sectional view of a kneaded mass of graphite flakes in a resin matrix;

Figure 2:
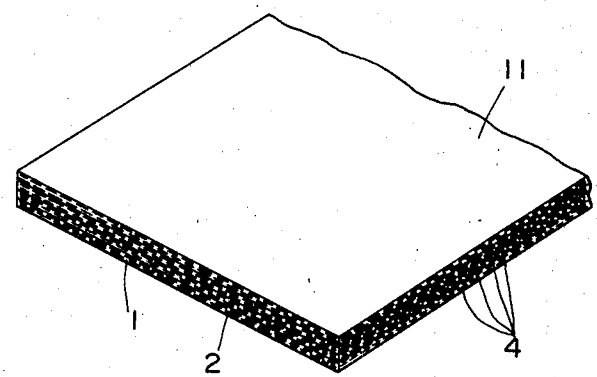
Figure 4A:
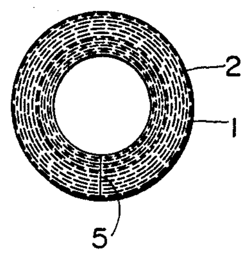
Figure 3:
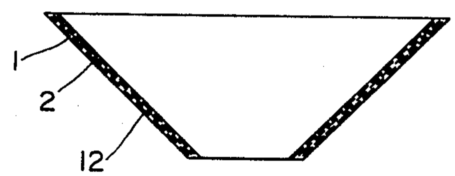
Figure 4B:
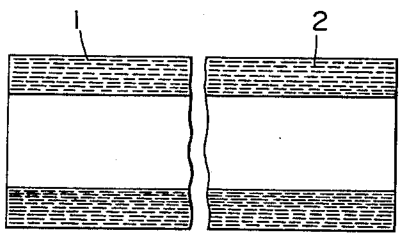
Figure 5:
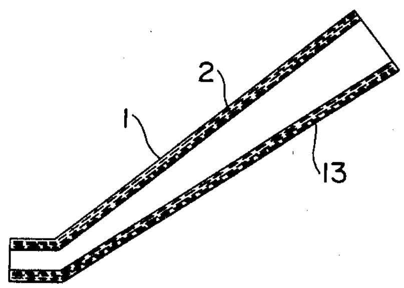

FIG. **1*b*** is a cross-sectional view of a rolled sheet in which graphite flakes are oriented parallel to the surface according to the present invention;

FIG. 2 is a perspective view of a laminate having four rolled sheets placed one on top of the other;

FIG. 3 is a cross-sectional view of an embodiment of the cone-shaped diaphragm according to the present invention;

FIGS. **4*a* and 4*b* are radial and axial cross-sectional views of a cylindrical member formed from the rolled sheet, respectively, FIG. 5 is an axial cross-sectional view of a cantilever prepared from the cylindrical member shown in FIGS. 4*a* and 4*b*;**

Figure 8:
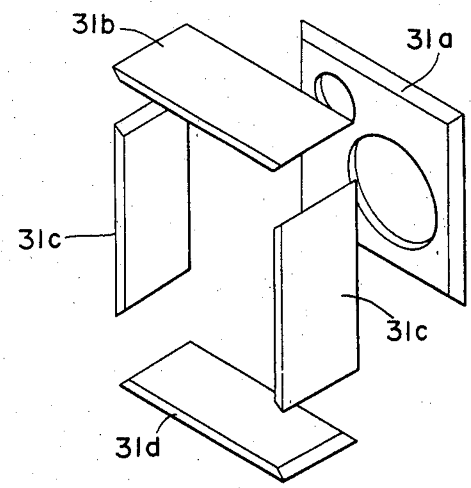
Figure 9B:
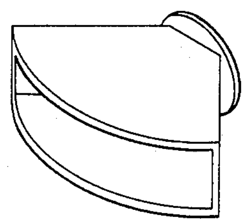
Figure 9C:
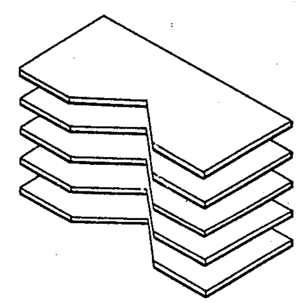
Figure 9D:
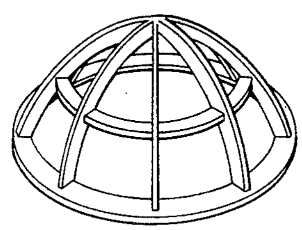
Figure 9E:
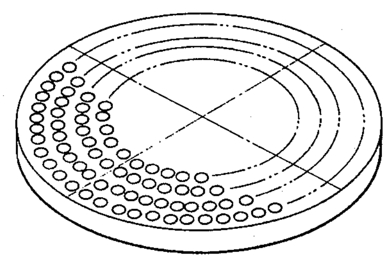

FIGS. ***6a*, *6b* and *6c*** illustrate successive steps of molding the kneaded mixture into a desired article;

FIGS. ***7a*, *7b* and *7c*** are perspective views of a speaker enclosure, a record player base and a radio/cassette player casing, respectively;

FIG. 8 is an exploded view of a speaker enclosure; and

FIGS. ***9a*, *9b*, *9c*, *9d* and *9e*** are perspective views of a speaker frame, a horn, an acoustic lens, an acoustic equalizer and a grille, respectively.

DESCRIPTION OF THE PREFERRED EMBODIMENT

The acoustic vibratory element according to the present invention is fabricated from a kneaded mixture mainly containing polypropylene and flaky graphite powder. The resin component may be polypropylene alone or in admixture with polymethyl methacrylate (PMMA).

Polypropylene which can be used herein may be propylene homopolymers and block and random copolymers of propylene with ethylene or any other comonomers. These propylene polymers may be prepared by and of well-known methods and are commercially available.

Preferred examples of polymethyl methacrylate are those having a softening point above 90° C.

Further, a rubber-like material may also be added to the polypropylene. It is also contemplated in the present invention to add both a rubber-like material and polymethyl methacrylate to the polypropylene. Examples of the rubber-like material are acrylonitrilebutadiene rubber (NBR), butyl rubber (IIR), styrenebutadiene rubber (SBR), etc. It is to be understood that the rubber-like materials contribute to a further improvement in internal loss.

In general, the modulus of elasticity of a resin gradually decreases as the surrounding temperature is raised. The temperature at which the modulus of elasticity decreases to one-half of the original value at room temperature is referred to as "half-modulus temperature" in this specification. When the half-modulus temperatures of resins of interest are compared, the half-modulus temperature of polypropylene is higher by about 25 degrees Centigrade than that of ordinary PVC, and PMMA is higher by 10 degrees Centigrade than the latter. Accordingly, molding materials comprising flaky graphite powder, polypropylene and optionally, PMMA have a higher half-modulus temperature and hence, improved temperature resistance as compared with our previous PVC-based molding materials.

The flaky graphite powder contributes to an improvement in modulus of elasticity, which cannot be expected in the case of resin components per se. The modulus of elasticity is substantially increased when graphite flakes are oriented in one direction, preferably parallel to the surface of a molded product. Graphite flakes have a thin disc- or platelet-form and preferably have an average particle size of about 0.1 to about 20 microns, particularly about 0.1 to about 5 microns. An improvement in modulus of elasticity attributable to graphite flakes and satisfactory moldability can be expected and moldings are free of embrittlement when about 10 to 90 parts by weight of graphite powder is combined with 90 to 10 parts by weight of the resin component. An outstanding improvement is achieved when about 50 to 75 parts by weight of graphite powder is combined with about 50 to 25 parts by weight of the resin component.

PMMA is widely used with polypropylene as its processing aid and the amount of PMMA to be added may be varied in the range of 1–30%, preferably 10–25% by weight of the polypropylene, depending on the shape and properties of the intended product. The rubber-like material may be added in an amount of about 2 to 50 parts per 100 parts by weight of the resin component. The addition of about 10 pph of the rubber-like material will result in a 20% reduction of modulus of elasticity while internal loss is increased about 1.5 to 2.0 times.

The present invention will be more fully understood by referring to the preferred embodiments in conjunction with the drawing.

Acoustic vibratory elements may be fabricated by first mixing flaky graphite powder with the resin component which may be polypropylene alone or its admixture with polymethyl methacrylate and an optional rubber-like material. Also, a plasticizer and/or stabilizer may optionally be added. The thus obtained mixture is fully kneaded by means of a conventional kneader or roll mill while heating to a temperature of 190°–210° C. at which the resins will soften or melt. The kneaded mass is designated at 3 in FIG. 1*a* as containing graphite flakes 2 in a resin matrix 1. As seen from FIG. 1*a*, graphite flakes 2 are randomly distributed throughout the resin matrix 1.

Figure 1A:
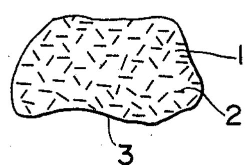
Figure 1B:
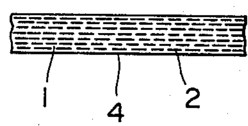

The kneaded material 3 is then repeatedly rolled by means of a roll mill into a sheet 4 as shown in FIG. 1*b*. The rolling of the kneaded material causes the graphite flakes 2 to be oriented parallel to the surface of the sheet 4. As a result of graphite orientation, the modulus of elasticity of the rolled sheet is increased two to three times over kneaded materials containing randomly distributed graphite flakes.

One sheet 4 may be fabricated into an acoustic vibratory element of a desired shape by any suitable method including vacuum forming, air-pressure forming or press molding while heating to about the softening temperature of the resin. If desired, two or more sheets 4 may be placed one on top of the other to form a laminate having a desired thickness. FIG. 2 illustrates such a laminate 11 having four sheets 4. Heat bonding or adhesive application may be effected to bond the adjoining sheets.

In fabricating a speaker diaphragm 12 as shown in FIG. 3, the sheet 4 or the laminate 11 of some sheets laminated to a desired thickness is press molded between upper and lower mold halves at about the softening temperature.

The resulting diaphragm 12 exhibits a high stiffness and a high modulus of elasticity as graphite flakes 2 are oriented parallel to the surface as shown in FIG. 3. Although the diaphragm is of cone shape in this example, it may be of dome shape.

A cantilever may be fabricated by rounding the single sheet 4 or the laminate 11 of several sheets into a cylinder as shown in FIGS. 4*a* and 4*b* while heating to about the softening temperature. The abutting edges of the rounded sheet are heat bonded under pressure or bonded with an adhesive at an interface 5. The thus integrated cylindrical member may be deformed into a cantilever 13 as shown in FIG. 5 using suitable deforming means at about the softening temperature.

Examples of the present invention are described below.

| | Parts by weight |
|---|---|
| Example 1 | |
| Polypropylene | 100 |
| Flaky graphite powder | 200 |
| Example 2 | |
| Polypropylene | 100 |
| Flaky graphite powder | 300 |
| Example 3 | |
| Polypropylene | 80 |
| Polymethyl methacrylate | 20 |
| Flaky graphite powder | 250 |
| Example 4 | |
| Polypropylene | 100 |
| IIR | 10 |
| Flaky graphite powder | 200 |
| Example 5 | |
| Polypropylene | 80 |
| Polymethyl methacrylate | 20 |
| IIR | 10 |
| Flaky graphite powder | 250 |
| Control | |
| Polyvinyl chloride | 100 |
| Flaky graphite powder | 200 |
| Lead stearate (stabilizer) | 5 |
| Dioctyl phthalate (plasticizer) | 10 |

In each Example, powder ingredients were fully kneaded in a kneader at a temperature of 190°–210° C. using the above-mentioned formulation. A portion of the thus kneaded material was rolled several times by means of a twin-roll mill, obtaining a sheet in which graphite flakes were oriented parallel to the surface. Samples of the kneaded materials and rolled sheets were determined for their physical properties. The results are shown in the following Table.

TABLE

| Example | Graphite distribution | Modulus of elasticity E ($\times 10^{10}$N/m$^2$) | Density $\rho$ ($\times 10^3$kg/m$^3$) | Internal loss tan $\delta$ | Half-modulus temperature* (°C.) |
|---|---|---|---|---|---|
| 1 | random | 1.6 | 1.47 | 0.05 | 80 |
| 1 | oriented | 3.2 | 1.47 | 0.05 | 80 |
| 2 | random | 2.5 | 1.60 | 0.04 | 80 |
| 2 | oriented | 4.3 | 1.60 | 0.04 | 80 |

TABLE-continued

| Example | Graphite distribution | Modulus of elasticity E ($\times 10^{10}$N/m²) | Density ρ ($\times 10^3$kg/m³) | Internal loss tan δ | Half-modulus temperature* (°C.) |
|---|---|---|---|---|---|
| 3 | random | 2.0 | 1.55 | 0.04 | 80 |
| 3 | oriented | 3.8 | 1.55 | 0.04 | 80 |
| 4 | random | 1.25 | 1.45 | 0.07 | 80 |
| 4 | oriented | 2.50 | 1.45 | 0.07 | 80 |
| 5 | random | 1.5 | 1.52 | 0.06 | 80 |
| 5 | oriented | 3.0 | 1.52 | 0.06 | 80 |
| Control | random | 2.2 | 1.8 | 0.03 | 55 |
| Control | oriented | 6.0 | 1.8 | 0.03 | 55 |
| Aluminum | | 7.1 | 2.7 | 0.003 | — |
| Kraft paper | | 0.2 | 0.6 | 0.05 | — |

*Temperature at which modulus of elasticity is reduced to one-half of the initial value when the temperature is raised from room temperature.

A sheet having a thickness of 100 microns obtained by rolling in each Example is vacuum formed at 100° C. into a cone-shaped diaphragm as shown in FIG. 3.

In addition, each sheet is heated to 100° C. before it is rounded on a cylindrical core. The abutting edges of the rounded sheet are heat bonded and the core is then withdrawn. The resulting cylindrical member is deformed into a cantilever shape as shown in FIG. 5.

The thus fabricated diaphragms and cantilevers exhibit a high modulus of elasticity and a high specific modulus as graphite flakes are oriented parallel to the surface. As seen from the Table, they show a high specific modulus E/ρ exceeding the specific modulus of metals such as aluminum and a large internal loss approximating the internal loss of paper. Due to these improved properties, the diaphragms of the present invention exhibit more flat frequency response over a wide frequency range without inducing partial vibration. In addition, the temperature resistance of the diaphragms according to the present invention is improved by about 20 degrees Centigrade over the previously proposed material as proved by a heat distortion temperature of above 120° C.

Figure 6A:
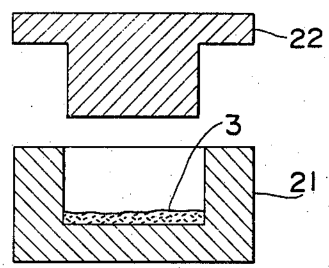
Figure 6B:
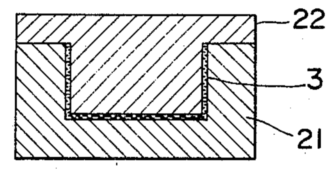
Figure 6C:
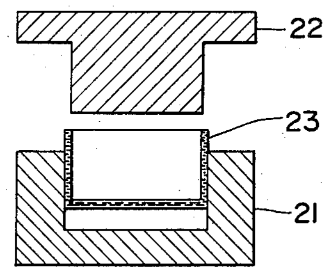

It is to be noted that the kneaded mixture 3 of the resin matrix 1 having graphite flakes 2 randomly distributed therein as shown in FIG. 1*a* is ready for use in molding various articles which need not necessarily have a substantially increased modulus of elasticity. Such articles are casings for acoustic equipment, for example, speaker enclosures, record player bases and portable radio/cassette player casings. Other examples are nonvibratory elements for speaker systems, for instance, speaker frames, horns, equalizers, acoustic lens, and grilles. These articles may be molded directly from the kneaded mixture 3 by any suitable molding techniques including compression molding, injection molding and press molding. A process of compression molding, for example, is illustrated in FIGS. 6*a*–6*c*. Lower and upper mold halves 21 and 22 define a cavity having a configuration corresponding to the shape of a desired article, when mated together. A metered amount of the kneaded mixture material 3 is placed on the cavity-defining surface of the lower mold half 21 as shown in FIG. 6*a*, and then the upper mold half 22 is moved downward to compress the material while heating, allowing the material to flow throughout the cavity. Thereafter, the mold halves 21 and 22 are cooled and separated. A molded article 23 is then removed.

Figure 7A:
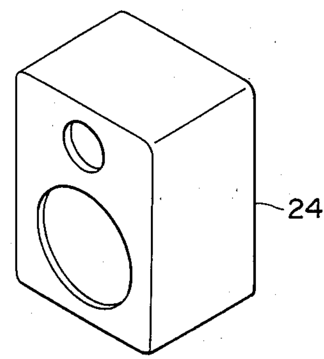
Figure 7B:
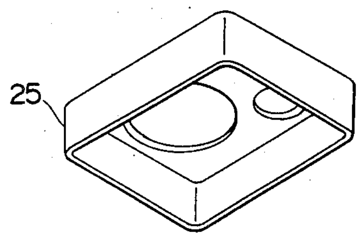
Figure 7C:
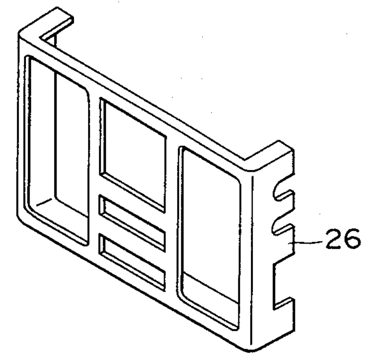
Figure 9A:
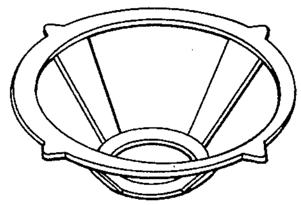

The molded article 23 may take the form of a speaker enclosure 24, a record player base 25, and a radio-cassette player casing 26 shown in FIGS. 7*a*, 7*b*, and 7*c*, respectively.

The kneaded material containing randomly distributed graphite flakes or the article 23 directly molded therefrom has a modulus of elasticity which is about one-half or one third of that of a material of the same composition, but having graphite flakes oriented. However, the former and the latter are equal in internal loss. Therefore, acoustic equipment casings molded from the kneaded material are satisfactory because in such uses only improved vibration damping characteristics are required for such casings.

Of course, the sheet 4 obtained from the kneaded material by rolling and having graphite flakes 2 oriented may be used to fabricate casings. Usually, a plurality of sheets are placed one on top of the other to form the laminate 11 as shown in FIG. 2. For example, a speaker enclosure may be fabricated by assembling a front panel 31*a*, a top panel 31*b*, side panels 31*c* and a bottom panel 31*d* as shown in FIG. 8. The assembly may be completed by heat bonding or adhesive bonding.

A record player base may be fabricated by superposing a number of sheets 4 to a required thickness. The laminate 11 is then provided with openings (not shown) for receiving a turntable assembly and a tone-arm base.

It will be understood that the article 23 may be either molded directly from the kneaded material or assembled from some components of rolled sheets. For example, a one-piece integral enclosure 24 shown in FIG. 7*a* can be easily molded directly from the kneaded material whereas the enclosure assembled from panels 31 of rolled sheets as shown in FIG. 8 is rigider than the former.

FIGS. 9*a* to 9*e* illustrate a speaker frame, a horn, an acoustic lens, an acoustic equalizer, and a grille which are typical examples of articles molded using the compression molding technique as shown in FIGS. 6*a* to 6*c*. Such an article may be either a one-piece article molded from the kneaded material or an article assembled from two or more shaped components. As the kneaded material has sufficient internal loss, these speaker elements molded therefrom are substantially free of resonance and exhibit sufficient vibration damping characteristics.

What we claim:

1. An acoustic vibratory element fabricated from a kneaded mixture comprising polypropylene, polymethyl methacrylate and flaky graphite powder, the graphite flakes being oriented substantially parallel to the surface of the element.

2. The acoustic vibratory element according to claim 1 wherein the kneaded and oriented mixture further contains a rubber-like material.

3. The acoustic vibratory element according to claim 2 wherein said rubber-like material is selected from the group consisting of acrylonitrile-butadiene rubber, butyl rubber and styrene-butadiene rubber.

4. An acoustic vibratory element according to claim 1, wherein the kneaded and oriented mixture contains 90 to 10% by weight of polypropylene and 10 to 90% by weight of flaky graphite powder and based on the weight of the polypropylene 1–30% by weight of polymethyl methacrylate and 2–50% by weight of a rubber-like material.

5. The acoustic vibratory element according to claim 4 wherein said kneaded and oriented mixture contains 50 to 25% by weight of polypropylene and 50 to 75% by weight of flaky graphite powder.

6. The acoustic vibratory element according to any one of claims 1, 2, 3, 5 or 4 wherein the oriented graphite flakes have a particle size of 0.1 to about 20 microns.

7. The acoustic vibratory element according to claim 6 wherein the oriented graphite flakes have a particle size of 0.1 to about 5 microns.

8. The acoustic vibratory element according to claim 1 wherein the element is fabricated by rolling the kneaded mixture into a sheet and then forming the sheet into a desired shape by way of vacuum forming, air-pressure forming or press molding.

9. The acoustic vibratory element according to claim 1 wherein said element is a diaphragm.

10. The acoustic vibratory element according to claim 9 wherein said element is a cone-shaped diaphragm.

11. The acoustic vibratory element according to claim 9 wherein said element is a dome-shaped diaphragm.

12. The acoustic vibratory element according to claim 1 wherein said element is a cantilever.

* * * * *